United States Patent
Son et al.

(10) Patent No.: US 11,945,922 B2
(45) Date of Patent: Apr. 2, 2024

(54) THICK POLYIMIDE FILM HAVING IMPROVED SURFACE QUALITY AND METHOD OF MANUFACTURING SAME

(71) Applicant: PI ADVANCED MATERIALS CO., LTD., Chungcheongbuk-do (KR)

(72) Inventors: Won Ho Son, Gyeonggi-do (KR); Hyong Sop Jo, Chungcheongbuk-do (KR)

(73) Assignee: PI ADVANCED MATERIALS CO., LTD., Chungcheongbuk-do (KR)

( * ) Notice: Subject to any disclaimer, the term of this patent is extended or adjusted under 35 U.S.C. 154(b) by 651 days.

(21) Appl. No.: 17/276,188

(22) PCT Filed: Nov. 22, 2018

(86) PCT No.: PCT/KR2018/014445
§ 371 (c)(1),
(2) Date: Mar. 15, 2021

(87) PCT Pub. No.: WO2020/080598
PCT Pub. Date: Apr. 23, 2020

(65) Prior Publication Data
US 2022/0033597 A1 Feb. 3, 2022

(30) Foreign Application Priority Data
Oct. 19, 2018 (KR) .................. 10-2018-0125122

(51) Int. Cl.
| | | |
|---|---|---|
| *C08J 5/18* | (2006.01) | |
| *C08G 73/10* | (2006.01) | |
| *C08L 79/08* | (2006.01) | |
| *C09J 7/10* | (2018.01) | |
| *C09J 179/08* | (2006.01) | |

(52) U.S. Cl.
CPC ............ *C08J 5/18* (2013.01); *C08G 73/1032* (2013.01); *C08G 73/1046* (2013.01); *C08G 73/1071* (2013.01); *C08L 79/08* (2013.01); *C09J 7/10* (2018.01); *C09J 179/08* (2013.01); *C08J 2379/08* (2013.01); *C08L 2203/206* (2013.01); *C09J 2479/08* (2013.01)

(58) Field of Classification Search
None
See application file for complete search history.

(56) References Cited

U.S. PATENT DOCUMENTS

| | | | | |
|---|---|---|---|---|
| 2010/0255221 A1* | 10/2010 | Jung | .......................... | C08J 5/18 428/220 |
| 2018/0312638 A1* | 11/2018 | Cho | .................... | C08G 73/1071 |

FOREIGN PATENT DOCUMENTS

| | | | |
|---|---|---|---|
| JP | 11228694 A | * | 8/1999 |
| JP | 2002-348388 A | | 12/2002 |

(Continued)

OTHER PUBLICATIONS

International Search Report from corresponding PCT Application No. PCT/KR2018/014445, dated Jul. 12, 2019.

*Primary Examiner* — Eli D. Strah
(74) *Attorney, Agent, or Firm* — Harness, Dickey & Pierce, P.L.C.

(57) ABSTRACT

The present invention provides a polyimide film in which a parameter A for the relationship of the viscosity (V) of a polyamic acid solution, the number average molecular weight (Mn) of polyamic acid, and the thickness (T) of a polyimide film falls within a range from 0.4 to 1.13.

17 Claims, 2 Drawing Sheets

(56) References Cited

FOREIGN PATENT DOCUMENTS

| JP | 4108808 | B2 | 6/2008 |
|----|---------|----|--------|
| KR | 10-2002-0065722 | A | 8/2002 |
| KR | 10-2017-0049912 | A | 5/2017 |
| KR | 10-1906393 | B1 | 10/2018 |

* cited by examiner

THICK POLYIMIDE FILM HAVING IMPROVED SURFACE QUALITY AND METHOD OF MANUFACTURING SAME

CROSS-REFERENCE TO RELATED APPLICATIONS

This application is a national phase application of PCT Application No. PCT/KR2018/014445, filed on Nov. 22, 2018, which claims benefit of and priority to Korean Patent Application 10-2018-0125122, filed on Oct. 19, 2018. The entire disclosure of the applications identified in this paragraph are incorporated herein by references.

TECHNICAL FIELD

The present invention relates to a thick polyimide film having improved surface quality and a method of manufacturing the same.

BACKGROUND ART

Polyimide (PI) is a polymer material, which is based on an imide ring that has a rigid aromatic backbone and very high chemical stability, and has the highest level of heat resistance, chemical resistance, electrical insulation, chemical resistance, and weather resistance among organic materials. Therefore, polyimide is receiving attention as an insulating material for microelectronic parts, which strongly require the properties described above.

Examples of such microelectronic parts include a thin circuit board, particularly a flexible metal foil clad laminate, which has high circuit integration and is flexible and is thus able to meet the trends of weight reduction and size reduction of electronic products. Polyimide is adhered and bonded in the form of a film to the metal foil of a circuit board to ensure insulation of the circuit and also to prevent a short circuit from occurring upon application of external force.

A polyimide film may be manufactured from polyamic acid, which is a precursor of polyimide. More specifically, a polyimide film may be manufactured through 'Imidization' in which the amic acid group in polyamic acid is converted into an imide group through heat and/or using a chemical catalyst after a film-forming composition including an organic solvent and polyamic acid is applied in the form of a thin film on a support.

Meanwhile, in the imidization process, the film-forming composition is gradually cured and converted into a complete film via a film intermediate that is formed before the complete film. Here, a large amount of gas is generated due to evaporation of the water and the solvent, and some of the gas may be left behind in the polyimide film after completion of imidization, and may thus be formed into voids called 'bubbles' in the film.

Such bubbles appear in the form of protrusions in which a portion of the surface of the polyimide film protrudes, and the protrusions are the main cause of a decrease in close contact between the polyimide film and the surface of the thin circuit board and thus a decrease in adhesion due thereto. Thus, the polyimide film in an ideal form may be one that is substantially free of bubbles and protrusions.

The damage caused by bubbles is particularly noticeable in a 'thick' polyimide film having a relatively high thickness, for example, a thickness of 55 μm or more. This is because more gas is generated during the manufacture of a thick polyimide film and also because the path for discharging the gas generated inside the film-forming composition or the film intermediate to the outside is lengthened.

The recent demand for a thick polyimide film is greatly increasing due to the strong need to protect and shield circuit boards, and overcoming the damage caused by bubbles described above is emerging as an immediate task.

Accordingly, a polyimide film having a high thickness and a smooth surface without protrusions due to bubbles is required.

SUMMARY

Technical Problem

An objective of the present invention is to provide a thick polyimide film having a smooth surface.

In an aspect of the present invention therefor, the viscosity of a polyamic acid solution, the number average molecular weight, and the thickness of a polyimide film are disclosed as essential factors for realizing the purposes of the present invention.

In particular, when the value of the parameter A showing the relationship between these factors falls within a predetermined range, the thick polyimide film may have smooth surface properties, substantially free of protrusions due to bubbles.

Accordingly, the present invention provides specific embodiments for implementation thereof.

Technical Solution

In an embodiment thereof, the present invention provides a polyimide film manufactured by imidizing a polyamic acid solution, in which the following parameter A falls within the range from 0.4 to 1.13:

$$A = \log((V \cdot Mn)^2 \cdot \sqrt{T}) - 21$$

Here, V is the viscosity of the polyamic acid solution and is 200,000 cP to 250,000 cP as measured at 23° C. when the solid content thereof is 18.5 wt %, Mn is the number average molecular weight of polyamic acid dissolved in the polyamic acid solution and is 100,000 g/mole to 150,000 g/mole, and T is the thickness of the polyimide film and is 55 μm to 110 μm.

In an embodiment thereof, the present invention provides a method of manufacturing the polyimide film.

In an embodiment thereof, the present invention provides an electronic part including the polyimide film as an insulating film.

Hereinafter, embodiments of the invention will be described in more detail in the order of "polyimide film" and "method of manufacturing polyimide film" according to the present invention.

Before the description, the terms or words used in the description and the claims of the present invention are not to be construed limitedly as having typical or dictionary meanings, but are to be interpreted as having meanings and concepts of the invention in keeping with the scope of the invention based on the principle that the inventors can appropriately define the terms in order to describe the invention in the best way.

Therefore, the configuration of the embodiment described in the present specification is merely the most preferred embodiment of the present invention, and does not represent the technical idea of the present invention, and it should be understood that at the time of the present application, there may be various equivalents and modifications capable of replacing the same.

In the present specification, the singular forms are intended to include the plural forms as well, unless the context clearly indicates otherwise. In the present specification, the terms "comprise", "include", "have", etc., when used in this specification specify the presence of stated features, integers, steps, elements, or combinations thereof, but do not preclude the presence or addition of one or more other features, integers, steps, elements, or combinations thereof.

In the present specification, "dianhydride" is intended to include precursors or derivatives thereof, which may not technically be dianhydride, but will nevertheless react with diamine to form polyamic acid, which may then be converted into polyimide.

In the present specification, "diamine" is intended to include precursors or derivatives thereof, which may not technically be diamine, but will nevertheless react with dianhydride to form polyamic acid, which may then be converted into polyimide.

In the present specification, when an amount, concentration, or other value or parameter is given as an enumeration of a range, a preferred range, or a preferred upper limit and a preferred lower limit, it is to be understood as specifically disclosing all ranges formed from any pair of any upper range limit or preferred value and any lower range limit or preferred value, whether or not such ranges are disclosed explicitly. When a range of numerical values is referred to herein, unless stated otherwise, for example, unless there is a limiting term such as "more than", "less than", etc., the range is intended to include endpoints thereof and all integers and fractions within the range. The scope of the present invention is not intended to be limited to the specific values mentioned when defining the range.

Polyimide Film

The polyimide film according to the present invention may be a polyimide film manufactured by imidizing a polyamic acid solution, in which the following parameter A may fall within the range from 0.4 to 1.13.

$$A = \log((V \cdot Mn)^2 \cdot \sqrt{T}) - 21$$

Here, V is the viscosity of the polyamic acid solution and is 200,000 cP to 250,000 cP as measured at 23° C. when the solid content thereof is 18.5 wt %, Mn is the number average molecular weight of polyamic acid dissolved in the polyamic acid solution and is 100,000 g/mole to 150,000 g/mole, and T is the thickness of the polyimide film and is 55 μm to 110 μm.

More specifically, V may be 215,000 cP to 245,000 cP, Mn may be 110,000 g/mole to 140,000 g/mole, and T may be 65 μm to 100 μm.

In the conversion of polyamic acid into a polyimide film, there are multiple reasons for the generation of bubbles, but a major one thereof may be related to 'imidization'. Here, imidization refers to a phenomenon, process, or method in which the amic acid group is converted into an imide group by inducing the cyclization and dehydration of the amic acid group constituting the polyamic acid through heat and/or using a chemical catalyst.

In general, in the imidization process, gas is generated due to evaporation of water and solvent inside the polyamic acid solution (or film intermediate).

Most of the generated gas is discharged to the outside of the polyamic acid solution (or film intermediate) and naturally disappears, accompanied by the simultaneous generation of bubbles. However, in the case in which the discharge of some gas is delayed in the gradually solidified solution and film, the gas is isolated at that position and may be left behind as a bubble inside the polyimide film obtained after completion of imidization.

Typically, the gas generated as described above does not pass through polymer chains, but bypasses the polymer chains or flows along an arbitrary path formed between the polymer chains. If the number of such paths is relatively small, the discharge of gas may be delayed as described above. In an exemplary embodiment, at the initial stage of imidization, the polymer chains of polyamic acid are comparatively flexible, so a relatively large number of paths through which gas may be discharged may be formed, but as imidization progresses, the polymer chains of polyamic acid or partially imidized polyimide are overlapped or oriented in a predetermined direction, so the path for discharging gas is limited to a few sites and the path distance may be extended.

At the same time, when forming a polyimide film having a high thickness, for example, a thickness of 55 μm or more, particularly 70 μm or more, the path for discharging the gas generated inside the polyamic acid solution (or film intermediate) to the outside is longer, and thus the probability of gas remaining as bubbles in the polyimide film increases exponentially.

However, when the value of the parameter A for the relationship of the number average molecular weight, the viscosity and the thickness falls within the specific range of the present invention, a polyimide film substantially free of bubbles due to gas may be formed despite the high thickness thereof.

The formation thereof will be clearly demonstrated in the 'Mode for Invention' described later, but it is assumed that, when the value of the parameter A falls within the specific range of the present invention, the amount of gas that is inevitably generated during imidization may be relatively reduced, and also, a number of spaces and paths through which the generated gas may be discharged are formed in the polyamic acid solution (or film intermediate).

Moreover, the parameter A reflects that the number average molecular weight, viscosity, and thickness have a complex relationship therebetween, rather than being dependent on each of the number average molecular weight, viscosity, and thickness as one independent variable, and there is a great significance in that qualitative properties, such as the quality of the resulting polyimide film depending on the parameter A, for example, the surface quality of a polyimide film having a predetermined thickness, are quantitatively predicted.

In a specific embodiment for the parameter A, the parameter A preferably falls within the range of 0.5 to 1.05, and more preferably 0.6 to 1.00.

The significance of the number average molecular weight, the viscosity of the polyamic acid solution, and the thickness of the polyimide film constituting the parameter A is described below.

The length of a polymer chain is typically related to the molecular weight thereof, and when one polymer chain has a relatively low molecular weight and thus the length thereof is short, a large number of spaces through which gas is capable of passing may be formed, which results in a higher possibility of a shorter arbitrary path being formed inside the polyamic acid solution (or film intermediate).

On the other hand, when one polymer chain has a relatively high molecular weight and thus the length thereof is long, a relatively small number of spaces through which gas is capable of passing may be formed, and a path may also be lengthened. However, it is not preferable to use a polymer chain having low molecular weight for the discharge of gas. This is because a decrease in the molecular weight results in severe deterioration of the mechanical properties of the polyimide film.

Accordingly, the present invention defines a preferred range of the number average molecular weight (Mn) as one of the factors of parameter A. In polyamic acid having a number average molecular weight within the above range, at least a portion of the polymer chains thereof has an appropriate length, so a space and a path for discharging gas may be formed as desired, and simultaneously, the resulting polyimide film preferably has desirable properties, rather than deteriorated non-desirable properties.

However, the preferred embodiment of the present invention in relation to bubbles is not implemented by the number average molecular weight alone, and because the number average molecular weight and the viscosity (V) of the polyamic acid solution described later act in combination, it is possible to reduce the amount of gas that is generated, which is related to bubble generation, and to efficiently discharge the gas, and thus the present invention may be implemented based on the interpretation of parameter A.

In another aspect, the preferred range of the number average molecular weight (Mn) according to the present invention has the result that at least a portion of the polymer chains constituting the polyimide film has an appropriate length, which may be associated with an advantage in that the penetration of an adhesive such as a prepreg through the space between the polymer chains of the polyimide film is facilitated. For this reason, when the polyimide film of the present invention is used as an insulating film, superior adhesion may be exhibited.

When the polyimide film according to the present invention is subjected to corona treatment and is tested using an adhesive, the polyimide film may have vastly superior adhesion of 1,100 gf/mm or more.

As another factor of the parameter A, the present invention defines a preferred range of the viscosity (V) of the polyamic acid solution.

In general, when the viscosity of a polyamic acid solution is low, the flexibility of the polymer chain during the imidization process may be improved, so the probability of creating a space through which gas is capable of passing may increase, but excessive flexibility thereof may make it impossible to form a film using the polyamic acid solution and may increase the amount of gas that is generated during imidization. On the other hand, when the viscosity thereof is too high, pressure may increase during film formation, which may cause serious processing problems. Moreover, aside from processing problems, the flexibility of the polymer chain during imidization is not good, and the gas may not be easily discharged, and thus damage due to bubbles described above may be apparent.

Within the preferred range of the viscosity of the polyamic acid solution of the present invention, there may be no damage. Within the above viscosity range, processing problems do not occur, and the viscosity (V) has the relationship with number average molecular weight (Mn) as shown in the parameter A, indicative of a positive influence thereof on the reduction in the amount of gas that is generated related to bubble generation and the mechanism of creation of the space for discharging gas.

As still another factor of the parameter A, the present invention provides the optimal film thickness (T) range, for example, 55 μm to 110 μm, particularly 65 μm to 100 μm, which is able to substantially prevent damage due to bubbles in association with the number average molecular weight (Mn) and the viscosity (V) of the polyamic acid solution described above.

When the polyimide film has a thickness within the above range and satisfies the range of the parameter A, the polyimide film is imparted with a smooth surface by suppressing the generation of bubbles, and the mechanical properties thereof may also reach a desired level.

The polyimide film of the present invention as described above may have a high thickness and simultaneously superior properties, such as a modulus of 3.3 Gpa or more, an elongation of 75% or more, a tensile strength of 25 Mpa or more, and 1 or fewer surface defects per 10 cm*10 cm area.

Meanwhile, a preferred embodiment of polyamic acid optimized for forming the polyimide film is described below.

In a specific embodiment thereof, the polyamic acid may have a weight average molecular weight/number average molecular weight ratio (=Mw/Mn) of 1.5 to 1.8. The cases in which the ratio exceeds the above upper limit or is less than the above lower limit may be respectively interpreted to mean that the molecular weight distribution of the polyamic acid is narrow or broad. In both of these cases, the mechanical properties of the polyimide film may be deteriorated, or bubbles may be generated.

The polyamic acid may include:

a first polymer chain having a number average molecular weight of 10,000 g/mole to 80,000 g/mole;

a second polymer chain having a number average molecular weight of greater than 80,000 g/mole to 170,000 g/mole; and a third polymer chain having a number average molecular weight of greater than 170,000 g/mole to 400,000 g/mole.

Here, based on the total weight of the polyamic acid, the amount of the first polymer chain may be 5% to 20%, the amount of the second polymer chain may be 70% to 90%, and the amount of the third polymer chain may be 5% to 10%.

Specifically, the value of the number average molecular weight of the polyamic acid may be determined by the amount of the second polymer chain, and within the above amount range, the number average molecular weight (Mn) may act optimally as the factor for the parameter A.

The polyamic acid may be prepared by polymerizing a dianhydride monomer and a diamine monomer.

The dianhydride monomer may be at least one selected from the group consisting of pyromellitic dianhydride (or PMDA), 3,3',4,4'-biphenyltetracarboxylic dianhydride (or s-BPDA), 2,3,3',4'-biphenyltetracarboxylic dianhydride (or a-BPDA), oxydiphthalic dianhydride (or ODPA), diphenylsulfone-3,4,3',4'-tetracarboxylic dianhydride (or DSDA), bis(3,4-dicarboxyphenyl)sulfide dianhydride, 2,2-bis(3,4-dicarboxyphenyl)-1,1,1,3,3,3-hexafluoropropane dianhydride, 2,3,3',4'-benzophenonetetracarboxylic dianhydride, 3,3',4,4'-benzophenonetetracarboxylic dianhydride (or BTDA), bis(3,4-dicarboxyphenyl)methane dianhydride, 2,2-bis(3,4-dicarboxyphenyl)propane dianhydride, p-phenylenebis(trimellitic monoester acid anhydride), p-biphenylenebis(trimellitic monoester acid anhydride), m-terphenyl-3,4,3',4'-tetracarboxylic dianhydride, p-terphenyl-3,4,3',4'-tetracarboxylic dianhydride, 1,3-bis(3,4-dicarboxyphenoxy)benzene dianhydride, 1,4-bis(3,4-dicarboxyphenoxy)benzene dianhydride, 1,4-bis(3,4-dicarboxyphenoxy)biphenyl dianhydride, 2,2-bis[(3,4-dicarboxyphenoxy)phenyl]propane dianhydride (or BPADA), 2,3,6,7-naphthalenetetracarboxylic dianhydride, 1,4,5,8-naphthalenetetracarboxylic dianhydride, and 4,4'-(2,2-hexafluoroisopropylidene)diphthalic dianhydride.

The diamine monomer may be at least one selected from the group consisting of 1,4-diaminobenzene (or paraphenylenediamine, PDA, PPD), 1,3-diaminobenzene, 2,4-diaminotoluene, 2,6-diaminotoluene, 3,5-diaminobenzoic acid (or DABA), 4,4'-diaminodiphenyl ether (or oxydianiline, ODA), 3,4'-diaminodiphenyl ether, 4,4'-diaminodiphenylmethane (methylenediamine), 3,3'-dimethyl-4,4'-diaminobiphenyl, 2,2'-dimethyl-4,4'-diaminobiphenyl, 2,2'-bis(trifluoromethyl)-4,4'-diaminobiphenyl, 3,3'-dimethyl-4,4'-diaminodiphenylmethane, 3,3'-dicarboxy-4,4'-diaminodiphenylmethane, 3,3',5,5'-tetramethyl-4,4'-diaminodiphenylmethane, bis(4-aminophenyl)sulfide, 4,4'-diaminobenzanilide, 3,3'-dichlorobenzidine, 3,3'-dimethylbenzidine (or o-tolidine), and 2,2'-dimethylbenzidine (or m-tolidine).

Method of Manufacturing Polyimide Film

The present invention pertains to a method of manufacturing a polyimide film, including:

(a) preparing a polyamic acid solution by polymerizing a dianhydride monomer including at least one component and a diamine monomer including at least one component in an organic solvent; and (b) imidizing the polyamic acid solution to obtain a polyimide film, in which the following parameter A falls within the range from 0.4 to 1.13.

$$A = \log((V \cdot Mn)^2 \cdot \sqrt{T}) - 21$$

Here, V is the viscosity of the polyamic acid solution and is 200,000 cP to 250,000 cP as measured at 23° C. when the solid content thereof is 18.5 wt %, Mn is the number average molecular weight of polyamic acid dissolved in the polyamic acid solution and is 100,000 g/mole to 150,000 g/mole, and T is the thickness of the polyimide film and is 50 μm to 110 μm.

The significance of the parameter A and the factors thereof may be the same as those for the 'polyimide film' of the embodiment described above.

Moreover, the dianhydride monomer and the diamine monomer may be appropriately selected from among non-limiting examples of the 'polyimide film' of the embodiment described above.

The organic solvent is not particularly limited, so long as it is a solvent able to dissolve polyamic acid, but the organic solvent may be, for example, an aprotic polar solvent.

Non-limiting examples of the aprotic polar solvent may include amide-based solvents such as N,N'-dimethylformamide (DMF), N,N'-dimethylacetamide (DMAc), etc., phenol-based solvents such as p-chlorophenol, o-chlorophenol, etc., N-methyl-pyrrolidone (NMP), gamma-butyrolactone (GBL), and diglyme, which may be used alone or in combinations of two or more thereof.

In some cases, an auxiliary solvent such as toluene, tetrahydrofuran, acetone, methyl ethyl ketone, methanol, ethanol, water, etc. may be used to adjust the solubility of polyamic acid. For example, the organic solvent, which is particularly preferably used in the preparation of the polyamic acid of the present invention, may include N,N'-dimethylformamide and N,N'-dimethylacetamide, which are amide-based solvents.

In step (a), the viscosity may be adjusted in a manner in which any one selected from among the dianhydride monomer and the diamine monomer is divided into multiple portions and added two or more times.

However, in order to obtain the viscosity (V) of the polyamic acid solution and the number average molecular weight (Mn) of the polyamic acid, the total amount of the monomer that is added in multiple portions, that is, any one of the dianhydride monomer and the diamine monomer, may be 98.8 mol % to 99.3 mol % relative to the total amount of the remaining monomer.

If the amount thereof exceeds the above upper limit, a large number of polymer chains having a relatively high molecular weight, for example, a number average molecular weight of 200,000 g/mole or more, may be formed, and the viscosity may increase, so the parameter A may not be satisfied, whereas if the amount thereof is less than the above lower limit, the parameter A may not be satisfied due to the decrease in the number average molecular weight and the viscosity, and moreover, the mechanical properties of the polyimide film may be greatly deteriorated, which is undesirable.

In step (a), in order to improve various properties of the polyimide film, such as slipperiness, thermal conductivity, electrical conductivity, corona resistance, loop hardness, and the like, during polymerization of polyamic acid or after completion of polymerization thereof, a filler may be further added. The filler that is added is not particularly limited, but preferred examples thereof include silica, titanium oxide, alumina, silicon nitride, boron nitride, calcium hydrogen phosphate, calcium phosphate, mica, and the like.

The average particle diameter of the filler is not particularly limited, and may be determined depending on the properties of the polyimide film to be modified and the type of filler that is added. For example, the average particle diameter of the filler may be 0.05 μm to 100 μm, particularly 0.1 μm to 75 μm, more preferably 0.1 μm to 50 μm, and more particularly 0.1 μm to 25 μm.

If the average particle diameter thereof is less than the above lower limit, it may be difficult to exhibit the modification effect, whereas if the average particle diameter thereof exceeds the above upper limit, the filler may greatly impair the surface properties of the polyimide film or may deteriorate the mechanical properties of the film.

Moreover, the amount of the filler that is added is not particularly limited, and may be determined depending on the properties of the polyimide film to be modified or the particle diameter of the filler.

For example, the amount of the filler that is added may be 0.01 parts by weight to 100 parts by weight, preferably 0.01 parts by weight to 90 parts by weight, and more preferably 0.02 parts by weight to 80 parts by weight, based on 100 parts by weight of the polyamic acid solution.

If the amount of the filler that is added is less than the above lower limit, it may be difficult to attain the modification effect due to the use of the filler, whereas if the amount thereof exceeds the above upper limit, the mechanical properties of the polyimide film may be greatly deteriorated. It goes without saying that the method of adding the filler is not particularly limited, and any known method may be used.

Also, step (b) may include:

(b-1) preparing a film-forming composition by mixing the polyamic acid solution with a dehydrating agent and an imidizing agent;

(b-2) preparing a film intermediate by applying the film-forming composition on a substrate and performing first heat treatment at 50 to 150° C.; and (b-3) subjecting the film intermediate to second heat treatment at 200 to 600° C.

Based on 1 mol of the amic acid group in the polyamic acid, the dehydrating agent may be added in an amount of 1.3 mol to 3.0 mol, and particularly 1.6 mol to 2.5 mol, and the imidizing agent may be added in an amount of 0.4 mol to 1.3 mol, and particularly 0.55 mol to 1.25 mol.

Here, the "dehydrating agent" is a material that promotes cyclization through dehydration of polyamic acid, non-limiting examples thereof including aliphatic acid anhydride, aromatic acid anhydride, N,N'-dialkylcarbodiimide, halogenated lower aliphatic, halogenated lower fatty acid anhydride, aryl phosphonic dihalide, and thionyl halide. Among these, aliphatic acid anhydride is preferable from the viewpoints of availability and cost, and non-limiting examples thereof include acetic anhydride (AA), propionic acid anhydride, and lactic acid anhydride, which may be used alone or in combinations of two or more thereof.

Also, the "imidizing agent" is a material having an effect of promoting the cyclization of polyamic acid, and examples thereof may include imine-based components, such as an aliphatic tertiary amine, an aromatic tertiary amine, and a heterocyclic tertiary amine. Among these, a heterocyclic tertiary amine is preferable from the viewpoint of reactivity as a catalyst. Non-limiting examples of the heterocyclic tertiary amine may include quinoline, isoquinoline, β-picoline (BP), pyridine, and the like, which may be used alone or in combinations of two or more thereof.

If the amount of each of the dehydrating agent and the imidizing agent is less than the above lower limit, chemical imidization may be insufficient, the resulting polyimide film may crack, and the mechanical strength of the film may be reduced. On the other hand, if the amount thereof exceeds the above upper limit, imidization may proceed excessively rapidly, and in this case, casting in the form of a film may become difficult, or the manufactured polyimide film may become brittle, which is undesirable.

In the step of preparing the film intermediate, the film-forming composition containing the dehydrating agent and/or the imidizing agent is cast in the form of a film on a support such as a glass plate, an aluminum foil, an endless stainless belt, or a stainless drum, after which the film-forming composition on the support is subjected to first heat treatment at a variable temperature in the range of 50° C. to 200° C., particularly 50° C. to 150° C. In this procedure, the dehydrating agent and/or the imidizing agent may act as a catalyst to thus rapidly convert the amic acid group into an imide group.

In some cases, in order to adjust the thickness and size of the polyimide film obtained through the subsequent second heat treatment and improve the orientation thereof, stretching the film intermediate may be performed between steps (b-2) and (b-3). Here, stretching may be performed in at least one direction of a machine direction (MD) and a transverse direction (TD) relative to the machine direction.

The film intermediate thus obtained may be fixed to a tenter and then subjected to second heat treatment at a variable temperature in the range of 50° C. to 650° C., particularly 200° C. to 600° C., thus removing the water, the catalyst, the residual solvent, etc. from the film intermediate. Also, by imidizing almost all remaining amic acid groups, the polyimide film of the present invention may be obtained. Furthermore, during the heat treatment process, the dehydrating agent and/or the imidizing agent may act as a catalyst, so the amic acid group may be rapidly converted into an imide group, making it possible to realize a high imidization rate.

In some cases, the polyimide film obtained as described above may be further cured through heating at a temperature of 400° C. to 650° C. for 5 to 400 seconds, and this process may be performed under a predetermined tension in order to relieve internal stress that may remain in the obtained polyimide film.

DETAILED DESCRIPTION

Figure 1:
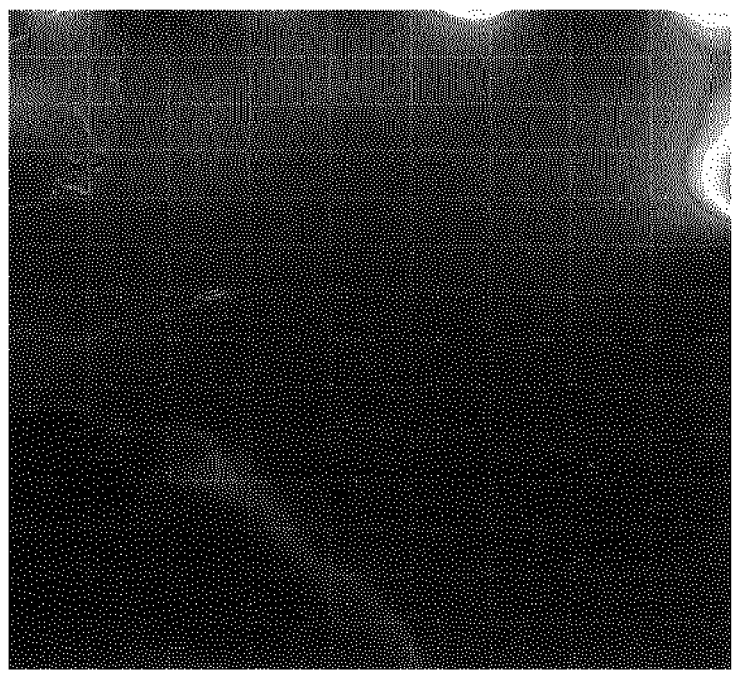
FIG. 1 is a photograph of the surface of the polyimide film of Example 1.

A better understanding of the functions and effects of the present invention may be obtained through the following examples. However, these examples are merely set forth to illustrate the present invention, and are not to be construed as limiting the scope of the present invention.

Example 1

While maintaining the inside of the reaction system at 15° C., 145 g of PMDA as a dianhydride monomer and 140 g of ODA as a diamine monomer were added to DMF, and polymerization was carried out with stirring for 1 hour.

Thereafter, 75 to 90 g of a PMDA solution (7.2%) was divided into multiple portions and added several times such that the amount of dianhydride that was added was 98.8 mol % relative to the amount of the diamine monomer that was added, and polymerization was terminated when the viscosity of the polyamic acid solution reached about 216,000 cP, thereby preparing a polyamic acid solution.

The polyamic acid solution thus prepared had a number average molecular weight of about 120,000 g/mole, measured through GPC (Tosoh HLC-8220GPC).

To the polyamic acid solution prepared above, 2.1 mol of acetic anhydride (AA) and 0.55 mol of β-picoline (BP) based on 1 mol of the amic acid group were added along with DMF, and the resulting mixture was applied on a stainless steel plate, followed by casting using a gap of 400 μm using a doctor blade and then first heat treatment at 50 to 150° C. for 4 minutes, thereby preparing a film intermediate.

The film intermediate thus prepared was separated from the stainless steel plate and fixed with frame pins, after which the frame on which the film intermediate was fixed was heat-treated at 400° C. for 7 minutes, and then the resulting film was separated therefrom, ultimately obtaining a polyimide film having an average thickness of 75 μm.

Example 2

A polyimide film having an average thickness of 75 μm was manufactured in the same manner as in Example 1, with the exception that a polyamic acid solution imparted with a viscosity of about 205,000 cP by adjusting the amounts of the dianhydride monomer and the diamine monomer that were added and having a number average molecular weight of about 114,000 g/mole, measured through GPC (Tosoh HLC-8220GPC), was prepared.

Example 3

A polyimide film having an average thickness of 75 μm was manufactured in the same manner as in Example 1, with the exception that a polyamic acid solution imparted with a viscosity of about 236,000 cP by adjusting the amounts of the dianhydride monomer and the diamine monomer that were added and having a number average molecular weight of about 145,000 g/mole, measured through GPC (Tosoh HLC-8220GPC), was prepared.

Example 4

Using the same method as in Example 1, a polyamic acid solution having a viscosity of about 216,000 cP and a number average molecular weight of about 120,000 g/mole was prepared, and a polyimide film having an average thickness of 55 μm was manufactured by adjusting the amount of the polyamic acid solution that was cast.

Example 5

A polyamic acid solution imparted with a viscosity of about 200,000 cP by adjusting the amounts of the dianhydride monomer and the diamine monomer that were added and having a number average molecular weight of about 110,000 g/mole was prepared, and a polyimide film having an average thickness of 55 μm was manufactured by adjusting the amount of the polyamic acid solution that was cast.

Example 6

A polyamic acid solution imparted with a viscosity of about 225,000 cP by adjusting the amounts of the dianhydride monomer and the diamine monomer that were added and having a number average molecular weight of about 132,000 g/mole was prepared, and a polyimide film having an average thickness of 55 μm was manufactured by adjusting the amount of the polyamic acid solution that was cast.

Example 7

Using the same method as in Example 1, a polyamic acid solution having a viscosity of about 216,000 cP and a number average molecular weight of about 120,000 g/mole was prepared, and a polyimide film having an average thickness of 110 μm was manufactured by adjusting the amount of the polyamic acid solution that was cast.

Example 8

Using the same method as in Example 2, a polyamic acid solution having a viscosity of about 205,000 cP and a number average molecular weight of about 114,000 g/mole was prepared, and a polyimide film having an average thickness of 110 μm was manufactured by adjusting the amount of the polyamic acid solution that was cast.

Example 9

A polyamic acid solution imparted with a viscosity of about 230,000 cP by adjusting the amounts of the dianhydride monomer and the diamine monomer that were added and having a number average molecular weight of about 140,000 g/mole was prepared, and a polyimide film having an average thickness of 110 μm was manufactured by adjusting the amount of the polyamic acid solution that was cast.

Example 10

Using the same method as in Example 1, a polyamic acid solution having a viscosity of about 216,000 cP and a number average molecular weight of about 120,000 g/mole was prepared, and a polyimide film having an average thickness of 100 μm was manufactured by adjusting the amount of the polyamic acid solution that was cast.

Comparative Example 1

A polyimide film having an average thickness of 75 μm was manufactured in the same manner as in Example 1, with the exception that a polyamic acid solution imparted with a viscosity of about 260,000 cP by adjusting the amounts of the dianhydride monomer and the diamine monomer that were added and having a number average molecular weight of about 155,000 g/mole, measured through GPC (Tosoh HLC-8220GPC), was prepared.

Comparative Example 2

A polyimide film having an average thickness of 75 μm was manufactured in the same manner as in Example 1, with the exception that a polyamic acid solution imparted with a viscosity of about 180,000 cP by adjusting the amounts of the dianhydride monomer and the diamine monomer that were added and having a number average molecular weight of about 90,000 g/mole, measured through GPC (Tosoh HLC-8220GPC), was prepared.

Comparative Example 3

Using the same method as in Comparative Example 1, a polyamic acid solution having a viscosity of about 270,000 cP and a number average molecular weight of about 160,000 g/mole was prepared, and a polyimide film having an average thickness of 55 μm was manufactured by adjusting the amount of the polyamic acid solution that was cast.

Comparative Example 4

Using the same method as in Comparative Example 2, a polyamic acid solution having a viscosity of about 180,000 cP and a number average molecular weight of about 90,000 g/mole was prepared, and a polyimide film having an average thickness of 55 μm was manufactured by adjusting the amount of the polyamic acid solution that was cast.

Comparative Example 5

Using the same method as in Comparative Example 1, a polyamic acid solution having a viscosity of about 260,000 cP and a number average molecular weight of about 155,000 g/mole was prepared, and a polyimide film having an average thickness of 110 μm was manufactured by adjusting the amount of the polyamic acid solution that was cast.

Comparative Example 6

A polyamic acid solution imparted with a viscosity of about 250,000 cP by adjusting the amounts of the dianhydride monomer and the diamine monomer that were added and having a number average molecular weight of about 150,000 g/mole was prepared, and a polyimide film having an average thickness of 100 μm was manufactured by adjusting the amount of the polyamic acid solution that was cast.

The viscosity of the polyamic acid solution, the number average molecular weight, and the thickness of the polyimide film manufactured in each of Examples 1 to 10 and Comparative Examples 1 to 6 are summarized in Table 1 below, and these values were substituted into the following equation to obtain a parameter A:

$$A = \log((V \cdot Mn)^2 \cdot \sqrt{T}) - 21 \quad \text{(Parameter A)}$$

TABLE 1

|  | Viscosity (V) of polyamic acid solution (unit: cP) | Number average molecular weight (Mn) of polyamic acid (unit: g/mole) | Thickness (T) of polyimide film (unit: μm) | Parameter A |
|---|---|---|---|---|
| Example 1 | 216,000 | 120,000 | 75 | 0.76 |
| Example 2 | 205,000 | 114,000 | 75 | 0.67 |
| Example 3 | 236,000 | 145,000 | 75 | 1.01 |
| Example 4 | 216,000 | 120,000 | 55 | 0.70 |
| Example 5 | 200,000 | 110,000 | 55 | 0.56 |
| Example 6 | 225,000 | 132,000 | 55 | 0.82 |
| Example 7 | 216,000 | 120,000 | 110 | 0.85 |
| Example 8 | 205,000 | 114,000 | 110 | 0.76 |
| Example 9 | 230,000 | 140,000 | 110 | 1.04 |
| Example 10 | 216,000 | 120,000 | 100 | 0.83 |
| Comparative Example 1 | 260,000 | 155,000 | 75 | 1.21 |
| Comparative Example 2 | 180,000 | 90,000 | 75 | 0.36 |
| Comparative Example 3 | 270,000 | 160,000 | 55 | 1.14 |
| Comparative Example 4 | 180,000 | 90,000 | 55 | 0.29 |
| Comparative Example 5 | 260,000 | 155,000 | 110 | 1.22 |
| Comparative Example 6 | 250,000 | 150,000 | 100 | 1.15 |

Test Example: Evaluation of Properties of Polyimide Film

The following four properties of the polyimide films obtained in Examples 1 to 10 and Comparative Examples 1 to 6 were analyzed.

(1) Surface Defect Properties

The surface of the polyimide film was observed with the naked eye, and based thereon, the number of surface defects per 10*10 cm area was measured and classified into grades. The results thereof are shown in Table 2 below.

(2) Modulus

The modulus was measured through the method according to ASTM D882 using an Instron 5564 model.

(3) Elongation

The elongation was measured through the method according to ASTM D1708.

(4) Tensile Strength

The tensile strength was measured through the method according to KS6518.

TABLE 2

|  | Surface defect grade** | Modulus (unit: GPa) | Elongation (unit: %) | Tensile strength (unit: MPa) |
|---|---|---|---|---|
| Example 1 | S | 3.65 | 79 | 27.2 |
| Example 2 | S | 3.50 | 82 | 27.0 |
| Example 3 | S | 3.55 | 76 | 27.4 |
| Example 4 | S | 3.64 | 82 | 28.3 |
| Example 5 | S | 3.64 | 87 | 27.8 |
| Example 6 | S | 3.63 | 88 | 28.0 |
| Example 7 | S | 3.43 | 89 | 25.9 |
| Example 8 | S | 3.40 | 88 | 26.1 |
| Example 9 | S | 3.39 | 91 | 26.1 |
| Example 10 | S | 3.45 | 91 | 26.2 |
| Comparative Example 1 | B | 3.51 | 78 | 27.4 |
| Comparative Example 2 | S | 2.82 | 65 | 22.8 |
| Comparative Example 3 | C | 3.54 | 80 | 28.5 |
| Comparative Example 4 | S | 2.89 | 62 | 23.2 |
| Comparative Example 5 | B | 3.44 | 89 | 26.3 |
| Comparative Example 6 | B | 3.42 | 88 | 26.7 |

**Grade S: 0 surface defects; Grade A: 5 or fewer surface defects; Grade B: 10 or fewer surface defects; Grade C: more than 10 surface defects As is apparent from Table 2, all of the Examples in which the value of the parameter A falls within the range (0.4 to 1.13) of the present invention were free of surface defects, thereby having highest grade for surface defects and exhibiting smooth surface properties.

In this regard, FIG. 1 shows a photograph of the surface of the polyimide film manufactured in Example 1 as a representative example. With reference thereto, the polyimide film had no protrusions on the surface thereof and a smooth surface.

Moreover, Examples also exhibited the following desirable levels for modulus, elongation and tensile strength.

This proves that the polyimide film according to the present invention has smooth surface properties despite the high thickness thereof, and can exhibit an appropriate level of mechanical strength.

Modulus: 3.3 Gpa or more
Elongation: 75% or more
Tensile strength: 25 Mpa or more On the other hand, most of Comparative Examples in which the value of the parameter A fell out of the range of the present invention exhibited low grades for surface defects due to the formation of a number of surface defects on the surface of the polyimide films, and had very poor surface properties, and there were no specific advantages with regard to properties such as modulus, elongation and tensile strength.

This shows that, when the value of the parameter A according to the present invention falls within a predetermined range, superior surface properties and appropriate mechanical properties of a thick polyimide film can be realized.

In addition, Comparative Examples 2 and 4 had surface defect grades similar to those of the Examples, but mechanical properties such as modulus, elongation, and tensile strength were evaluated to be much lower than those of Examples, indicating that the desired surface properties and mechanical properties of the thick polyimide film are difficult to realize simultaneously, as will be sufficiently predicted by those skilled in the art.

Figure 2:
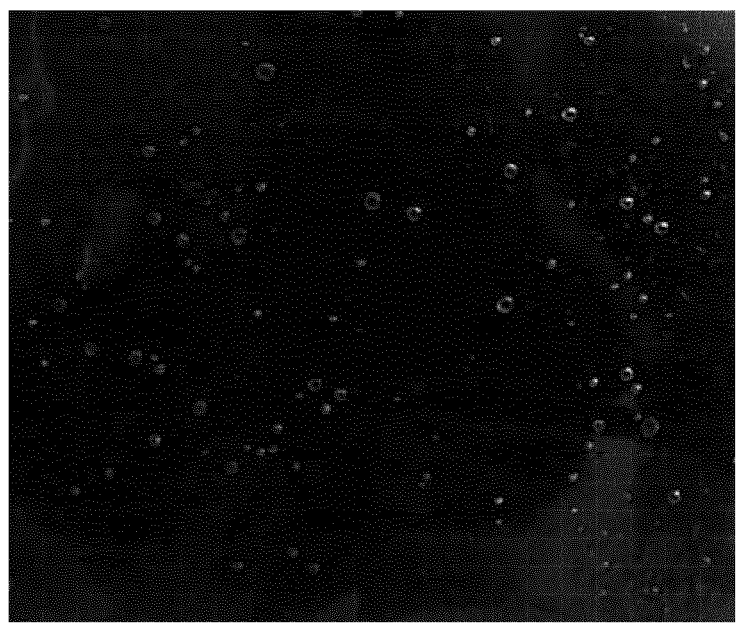
FIG. 2 is a photograph of the surface of the polyimide film of Comparative Example 1.

Regarding the surface properties, FIG. 2 shows a photograph of the surface of the polyimide film manufactured in Comparative Example 1. As seen in FIG. 2, a number of protrusions caused by bubbles were observed on the surface of the polyimide of Comparative Example 1.

Although the present invention has been described above with reference to embodiments thereof, those skilled in the art to which the present invention belongs will understand that it is possible to implement various applications and modifications without exceeding the scope of the present invention based on the above description.

INDUSTRIAL APPLICABILITY

As described hereinbefore, the polyimide film and the method of manufacturing the same according to the present invention are characterized in that the value of the parameter A falls within a predetermined range.

The parameter A quantitatively represents the relationship between the number average molecular weight, the viscosity of the polyamic acid solution, and the thickness, and in particular, the qualitative features of the polyimide film, substantially free of bubbles due to gas even at the high thickness thereof, are represented as a quantitative value.

When the value of the parameter A falls within the range of the present invention, the amount of gas that is inevitably generated during imidization is relatively reduced, and also, a large number of spaces and paths through which the generated gas can be discharged are formed in the polyamic acid solution (or film intermediate), and thus, despite having a high thickness, the polyimide film can be substantially free of bubbles due to gas.

What is claimed is:

1. A polyimide film manufactured by imidizing a polyamic acid solution, wherein a following parameter A falls within a range from 0.4 to 1.13:

$$A = \log((V \cdot Mn)^2 \cdot \sqrt{T}) - 21$$

wherein V is a viscosity of the polyamic acid solution and is 200,000 cP to 250,000 cP as measured at 23° C. when a solid content thereof is 18.5 wt %, Mn is a number average molecular weight of polyamic acid dissolved in the polyamic acid solution and is 100,000 g/mole to 150,000 g/mole, and T is a thickness of the polyimide film and is 55 μm to 110 μm.

2. The polyimide film of claim 1, wherein the polyamic acid has a weight average molecular weight/number average molecular weight ratio (=Mw/Mn) of 1.5 to 1.8.

3. The polyimide film of claim 1, wherein the polyamic acid comprises:
a first polymer chain having a number average molecular weight of 10,000 g/mole to 80,000 g/mole;
a second polymer chain having a number average molecular weight of greater than 80,000 g/mole to 170,000 g/mole; and
a third polymer chain having a number average molecular weight of greater than 170,000 g/mole to 400,000 g/mole.

4. The polyimide film of claim 3, wherein, based on a total weight of the polyamic acid,
an amount of the first polymer chain is 5% to 20%,
an amount of the second polymer chain is 70% to 90%, and
an amount of the third polymer chain is 5% to 10%.

5. The polyimide film of claim 1, wherein when the polyimide film is subjected to corona treatment and is tested using an adhesive, an adhesion of the polyimide film is 1,100 gf/mm or more.

6. The polyimide film of claim 1, having a modulus of 3.3 Gpa or more, an elongation of 75% or more, a tensile strength of 25 Mpa or more, and 1 or fewer surface defects per 10 cm*10 cm area.

7. The polyimide film of claim 1, wherein the V is 215,000 cP to 245,000 cP, the Mn is 110,000 g/mole to 140,000 g/mole, and the T is 65 μm to 100 μm.

8. The polyimide film of claim 1, wherein the parameter A falls within the range from 0.5 to 1.05.

9. The polyimide film of claim 1, wherein the parameter A falls within the range from 0.6 to 1.00.

10. The polyimide film of claim 1, wherein the polyamic acid is prepared by polymerizing a dianhydride monomer and a diamine monomer.

11. The polyimide film of claim 10, wherein the dianhydride monomer is at least one selected from the group consisting of pyromellitic dianhydride (or PMDA), 3,3',4,4'-biphenyltetracarboxylic dianhydride (or s-BPDA), 2,3,3',4'-biphenyltetracarboxylic dianhydride (or a-BPDA), oxydiphthalic dianhydride (or ODPA), diphenylsulfone-3,4,3',4'-tetracarboxylic dianhydride (or DSDA), bis(3,4-dicarboxyphenyl)sulfide dianhydride, 2,2-bis(3,4-dicarboxyphenyl)-1,1,1,3,3,3-hexafluoropropane dianhydride, 2,3,3',4'-benzophenonetetracarboxylic dianhydride, 3,3',4,4'-benzophenonetetracarboxylic dianhydride (or BTDA), bis(3,4-dicarboxyphenyl)methane dianhydride, 2,2-bis(3,4-dicarboxyphenyl)propane dianhydride, p-phenylenebis(trimellitic monoester acid anhydride), p-biphenylenebis(trimellitic monoester acid anhydride), m-terphenyl-3,4,3',4'-tetracarboxylic dianhydride, p-terphenyl-3,4,3',4'-tetracarboxylic dianhydride, 1,3-bis(3,4-dicarboxyphenoxy)benzene dianhydride, 1,4-bis(3,4-dicarboxyphenoxy)benzene dianhydride, 1,4-bis(3,4-dicarboxyphenoxy)biphenyl dianhydride, 2,2-bis[(3,4-dicarboxyphenoxy)phenyl]propane dianhydride (or BPADA), 2,3,6,7-naphthalenetetracarboxylic dianhydride, 1,4,5,8-naphthalenetetracarboxylic dianhydride, and 4,4'-(2,2-hexafluoroisopropylidene)diphthalic dianhydride.

12. The polyimide film of claim 10, wherein the diamine monomer is at least one selected from the group consisting of 1,4-diaminobenzene (or paraphenylenediamine, PDA, PPD), 1,3-diaminobenzene, 2,4-diaminotoluene, 2,6-diaminotoluene, 3,5-diaminobenzoic acid (or DABA), 4,4'-diaminodiphenyl ether (or oxydianiline, ODA), 3,4'-diaminodiphenyl ether, 4,4'-diaminodiphenylmethane (or 4,4'-methylenediamine, MDA), 3,3'-dimethyl-4,4'-diaminobiphenyl, 2,2'-dimethyl-4,4'-diaminobiphenyl, 2,2'-bis(trifluoromethyl)-4,4'-diaminobiphenyl, 3,3'-dimethyl-4,4'-diaminodiphenylmethane, 3,3'-dicarboxy-4,4'-diaminodiphenylmethane, 3,3',5,5'-tetramethyl-4,4'-diaminodiphenylmethane, bis(4-aminophenyl)sulfide, 4,4'-diaminobenzanilide, 3,3'-dichlorobenzidine, 3,3'-dimethylbenzidine (or o-tolidine), and 2,2'-dimethylbenzidine (or m-tolidine).

13. A method of manufacturing a polyimide film, comprising:
(a) preparing a polyamic acid solution by polymerizing a dianhydride monomer comprising at least one component and a diamine monomer comprising at least one component in an organic solvent; and
(b) imidizing the polyamic acid solution to obtain a polyimide film, wherein a following parameter A falls within a range from 0.4 to 1.13:

$$A = \log((V \cdot Mn)^2 \cdot \sqrt{T}) - 21$$

wherein V is a viscosity of the polyamic acid solution and is 200,000 cP to 250,000 cP as measured at 23° C. when a solid content thereof is 18.5 wt %, Mn is a number average molecular weight of polyamic acid dissolved in the polyamic acid solution and is 100,000 g/mole to 150,000 g/mole, and T is a thickness of the polyimide film and is 50 μm to 110 μm.

14. The method of claim 13, wherein, in step (a), the viscosity is adjusted in a manner in which any one selected from among the dianhydride monomer and the diamine monomer is divided into multiple portions and added two or more times.

15. The method of claim 14, wherein a total amount of the monomer that is added in multiple portions is 98.8 mol % to 99.3 mol % relative to a total amount of a remaining monomer.

16. The method of claim 13, wherein step (b) comprises:
(b-1) preparing a film-forming composition by mixing the polyamic acid solution with a dehydrating agent and an imidizing agent;
(b-2) preparing a film intermediate by applying the film-forming composition on a substrate and performing first heat treatment at 50 to 150° C.; and
(b-3) subjecting the film intermediate to second heat treatment at 200 to 600° C.

17. An electronic part comprising the polyimide film of claim 1 as an insulating film.

\* \* \* \* \*